United States Patent

Ducamus et al.

[15] 3,676,709

[45] July 11, 1972

[54] FOUR-PHASE DELAY ELEMENT

[72] Inventors: Jean Martial Ducamus, Paris; Claude-Jane Fernandez, Montrouge, both of France

[73] Assignee: U.S. Philips Corporation, New York, N.Y.

[22] Filed: May 10, 1971

[21] Appl. No.: 141,494

[30] Foreign Application Priority Data

May 13, 1970 France ..................................7017392

[52] U.S. Cl. ..............................307/279, 307/205, 307/208, 307/221 C

[51] Int. Cl. ..........................................................H03k 3/26

[58] Field of Search ...............307/221 C, 205, 208, 279, 251

[56] References Cited

UNITED STATES PATENTS 3,322,974 5/1967 Ahrons et al........................307/221 C 3,576,447 4/1971 McKenny...........................307/221 C

OTHER PUBLICATIONS

Application Notes Dec. 1967 " MTOS Shift Registers" p. 3 by Sidorsky. Pub. by Gen. Instr. Corp.

Electronic Design News June 10, 1968 " Multiphase Clocking" by Boysel et al. p. 51

*Primary Examiner*—John S. Heyman

*Attorney*—Frank R. Trifari

[57] ABSTRACT

A four-phase logic delay circuit using two cascaded stages of field-effect transistors where each stage has two cascaded field-effect transistors for the storage of logic signals and two additional field-effect transistors for the isolation of the storage field-effect transistors for the duration of two phases of the four-phase signal.

3 Claims, 4 Drawing Figures

Figure 1:
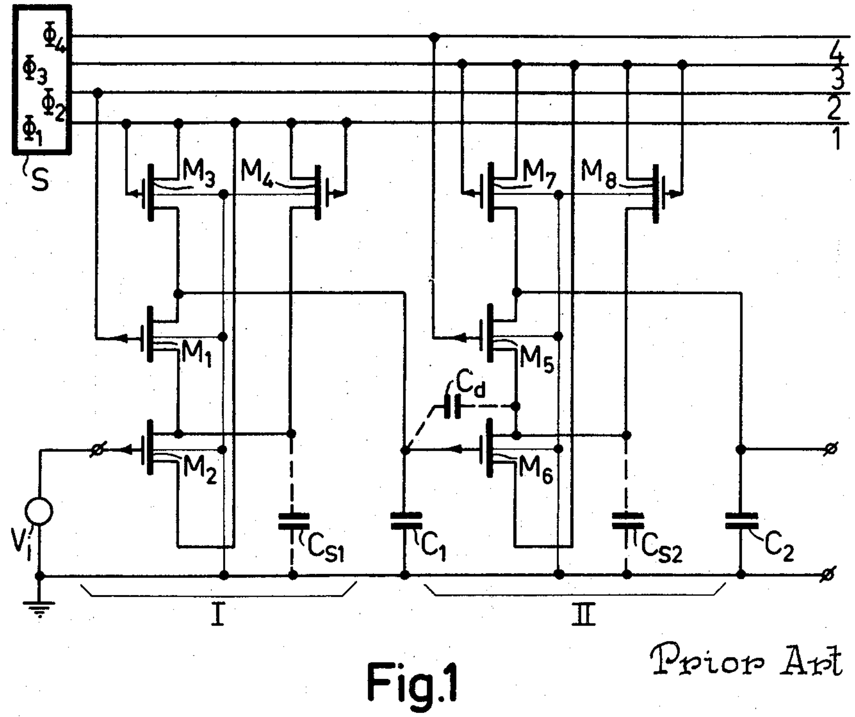
Fig.1 Prior Art

INVENTORS
JEAN MARTIAL DUCAMUS
CLAUDE-JANE FERNANDEZ
BY
AGENT

INVENTORS
JEAN MARTIAL DUCAMUS
CLAUDE-JANE FERNANDEZ
BY
AGENT

INVENTORS
JEAN MARTIAL DUCAMUS
CLAUDE-JANE FERNANDEZ
BY Frank R. Trifari
AGENT

FOUR-PHASE DELAY ELEMENT

The invention relates to a four-phase delay element comprising the cascade arrangement of at least a first and a second stage which each include at least a first and a second field-effect transistor, the source of the first transistor being connected to the drain of the second transistor, whilst the drain of the first transistor of the first stage and the gate of the second transistor of the second stage are connected to a storage capacitor, means being provided for applying a logical signal to the gate of the second transistor of the first stage, whilst the drain of the first transistor of the first stage is connected to a first clock-pulse line and the gate of this transistor is connected to a second clock-pulse line, the drain of the first transistor of the second stage being connected to a third clock-pulse line and the gate of this transistor being connected to a fourth clock-pulse line. These delay elements are particularly suited for use in dynamic four-phase logic systems such, for example, as shift registers. In a known delay element of this type the drain of the first transistor of the first stage is connected through the main current path of a field-effect transistor to the first clock-pulse line, whilst the gate of the latter transistor is also connected to this first clock-pulse line. The drain of the first transistor of the second stage is connected via the main current path of a field-effect transistor to the third clock-pulse line, whilst the gate of the latter transistor is also connected to this third clock-pulse line. In this known delay element the drain of the second transistor of the first stage is connected via the main current path of a field-effect transistor to the first clock-pulse line, and the drain of the second transistor of the second stage is connected via the main current path of a field-effect transistor to the third clock-pulse line. The latter feature has the disadvantage that in the operational condition of the delay element under certain circumstances the logical input signal may be incorrectly delayed, as will be explained hereinafter.

It is an object of the present invention to obviate this disadvantage and a four-phase delay element according to the invention is characterized in that the drain of the second transistor of the first stage is also connected to the third or to the fourth clock-pulse line and the drain of the second transistor of the second stage is connected to the first or to the second clock-pulse line, meanS being provided to isolate the source of the second transistor of the first stage from the first clock-pulse line during the application of clock pulses to the first and second clock-pulse lines, whilst further means are provided to, isolate the second transistor of the second stage from the third clock-pulse line during the application of clock-pulses to the third and fourth clock-pulse lines.

Figure 2:
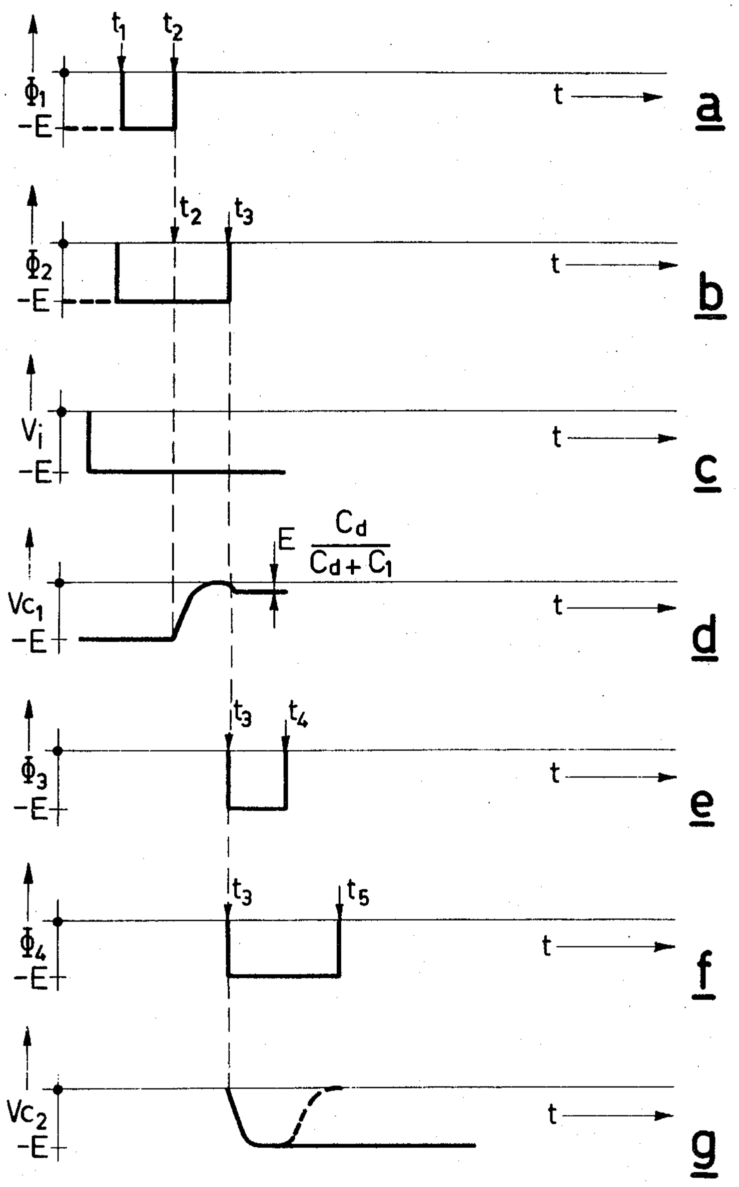

An embodiment of the invention will now be described, by way of example, with reference to the accompanying diagrammatic drawings, in which FIG. 1 is a schematic circuit diagram of a known delay element, FIG. 2 shows voltage waveforms illustrating the the operation of the delay element shown in FIG. 1.

Figure 3:
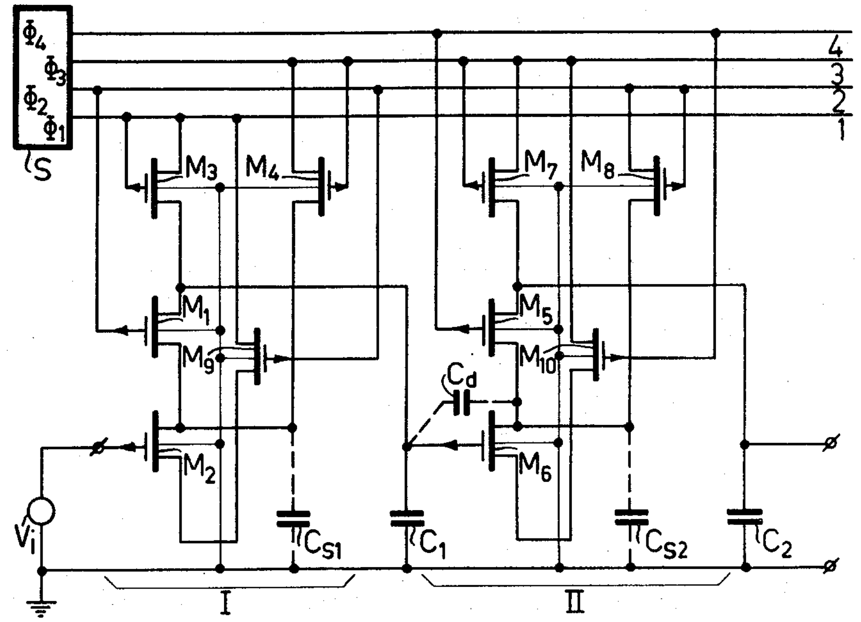
Figure 4:
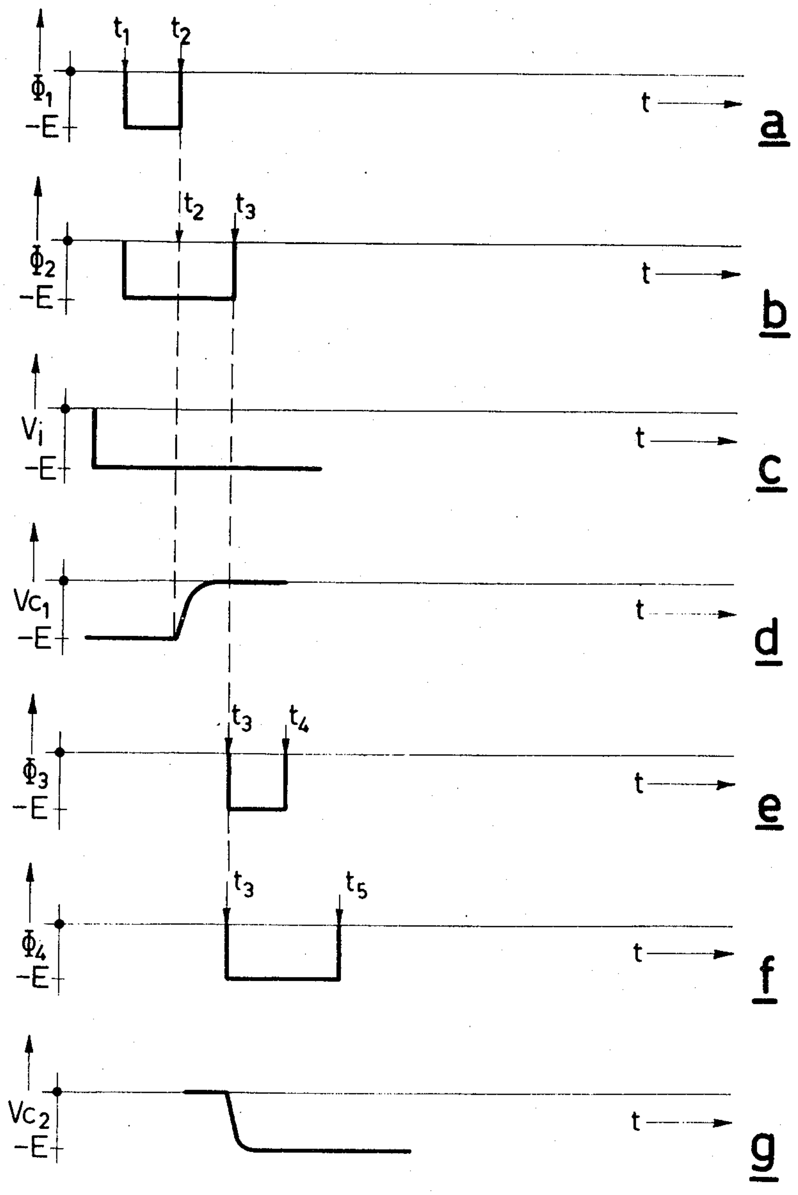

FIG. 3 is a schematic circuit diagram of a delay element according to the invention, and FIG. 4 shows voltage waveforms illustrating the operation of the delay element shown in FIG. 3.

The delay element shown in FIG. 1 comprises two stages I and II. The first transistor of the first stage is constituted by a field-effect transistor $M_1$ and the second transistor of the first stage is constituted by a field-effect transistor $M_2$. The gate of the transistor $M_1$ is connected to a clock-pulse line 2 which is connected to an output $\Phi_2$ of a switching voltage supply S. The drain of the transistor $M_1$ is connected via the main current path of a field-effect transistor $M_3$ to a clock-pulse line 1, which is connected to an output $\Phi_1$ of the switching voltage supply S The source of the transistor $M_1$ is connected to the drain of the transistor $M_2$, the gate of which is connected to the clock-pulse line 1. The drain of the transistor $M_2$ is connected via the main current path of a transistor $M_4$ to the clock-pulse line 1. The drain of the transistor $M_1$ is connected to a storage capacitor $C_1$. A logical input signal $V_i$ is applied to the gate of the transistor $M_2$. The first transistor of the second stage is constituted by a field-effect transistor $M_5$, and the second transistor of this stage is constituted by a field-effect transistor $M_6$. The gate of the transistor $M_5$ is connected to a clock-pulse line 4 which is connected to an output $\Phi_4$ of the switching voltage supply S. The drain of the transistor $M_5$ is connected via the main current path of a field-effect transistor $M_7$ to a clock-pulse line 3, which is connected to an output $\Phi_3$ of the switching voltage supply S. The source of the transistor $M_5$ is connected to the drain of the transistor $M_6$, the source of which is connected to the clock-pulse line 3. The drain of the transistor $M_6$ is connected via the main current path of a transistor $M_8$ to the clock-pulse line 3. The drain of the transistor $M_5$ is connected to a storage capacitor $C_2$, and the gate of the transistor $M_6$ is connected to the storage capacitor $C_1$. The operation of the known delay element is as follows:

It is assumed that the logical input signal applied to the gate of the transistor $M_2$ is a logical 1(–E volts) see FIG. 2*c*. During the time interval ($t_1$–$t_2$) the voltage at the output $\Phi_1$ of the switching voltage supply S is equal to –E volts, see FIG. 2*a*. During this interval the transistor $M_3$ will be conductive and the storage capacitor $C_1$ is charged until the voltage across it is –E volts. During the said time interval the transistor $M_4$ also is conductive, so that a capacitance $C_{s1}$ between the drain of the transistor $M_2$ and the substrate (earth) will be charged until the voltage across it is equal to –E volts. During the time interval ($t_2$–$t_3$) the voltage at the gates of the transistors $M_1$ and $M_2$ is equal to –E volts, see FIGS. 2*b* and 2*c*.

As a result these transistors are conductive and the storage capacitor $C_1$ will be discharged during this interval until the voltage across it has become equal to 0 volts, see FIG. 2*d*. During the time interval ($t_3$–$t_4$) the voltage at the output $\Phi_3$ of the switching voltage supply S is equal to –E volts see FIG. 2*e*. As a result, the transistors $M_7$ and $M_8$ will be conductive. The storage capacitor $C_2$ is charged via the transistor $M_7$ until the voltage across this capacitor is equal to –E volts, see FIG. 2*g* and a capacitance $C_{s2}$ between the drain of the transistor $M_6$ and the substrate (earth) is charged via the transistor $M_8$ until the voltage across it is equal to –E volts. The latter feature also means that the voltage across the series combination of the storage capacitor $C_1$ and a capacitance $C_d$ between the gate and the drain of the transistor $M_6$ will be equal to –E volts. Consequently, the voltage across the storage capacitor $C_1$ will become equal to $$V_{c1} = -E \frac{C_d}{C_d + C_1} \text{ volts} \qquad (1)$$

see FIG. 2*d*. During the time interval ($t_4$-$t_5$) the voltage at the output $\Phi_4$ of the switching voltage supply is equal to $-E$ volts and this is also the voltage at the gate of the transistor $M_5$. The voltage across the capacitance $C_{s2}$ also $= -E$ volts. During the latter time interval the transistor $M_5$ will not be conductive, and the voltage across the storage capacitor $C_2$ will remain equal to –E volts, see FIG. 2*g*. The latter feature holds only if it is ensured that the voltage across the storage capacitor $C_1$ according to the relation (1) remains smaller than the threshold gate voltage of the transistor $M_6$. This means that $C_1$ must be much larger than $C_d$ and that the voltage $E$ must not be too high. However, in the cases where the capacitance value of the storage capacitor $C_1$ becomes comparable to that of the stray capacitance $C_d$, the transistor $M_6$ is likely to become conductive during the time interval ($t_4$–$t_5$). As a result, the capacitor $C_2$ will be discharged to 0 volts, which means that the information stored in the capacitor $C_2$(0 volts = logical 0) no longer corresponds to the information applied to the input of the delay element ($-E$ volts = logical 1), see the broken-line curve in FIG. 2*g*. As is known, the capacitance value of the storage capacitor determines the delay of the delay element. Because this capacitor, as has been described hereinbefore, must not be small, the known delay element is unsuitable for operation at high switching frequencies.

The delay element shown in FIG. 3 comprises two stages I and II. The first transistor of the first stage is constituted by a field-effect transistor $M_1$, and the second transistor of this stage is constituted by a field-effect transistor $M_2$. The gate of the transistor $M_1$ is connected to a clock-pulse line 2, which is connected to an output $\Phi_2$ of a switching voltage supply S. The drain of the transistor $M_1$ is connected via the main current path of a field-effect transistor $M_3$ to a clock-pulse line 1 which is connected to the output $\Phi_1$ of the switching voltage supply S. The source of the transistor $M_1$ is connected to the drain of the transistor $M_2$ the source of which is connected via the main current path of a transistor $M_9$ to the clock-pulse line 1. The drain of the transistor $M_2$ is connected via the main current path of a transistor $M_4$ to a clock-pulse line 3 which is connected to the output $\Phi_3$ of the switching voltage supply S. The drain of the transistor $M_1$ is connected to a storage capacitor $C_1$. A logical input signal $V_i$ is applied to the gate of the transistor $M_2$. The first transistor of the second stage is constituted by a field-effect transistor $M_5$, and the second transistor of this stage is constituted by a field-effect transistor $M_6$. The gate of the transistor $M_5$ is connected to a clock-pulse line 4 which is connected to the output $\Phi_4$ of the switching voltage supply S. The drain of the transistor $M_5$ is connected via the main current path of the field-effect transistor $M_7$ to a clock-pulse line 3. The source of the transistor $M_5$ is connected to the drain of the transistor $M_6$ the source of which is connected via the main current path of a transistor $M_{10}$ to the clock-pulse line 3. The drain of the transistor $M_6$ is connected via the main current path of a transistor $M_8$ to the clock-pulse line 1. The drain of the transistor $M_5$ is connected to the storage capacitor $C_2$ and the gate of the transistor $M_6$ is connected to the storage capacitor $C_1$. The operation of the delay element according to the invention is a follows:

It is assumed that a logical 1 (=E volts) is applied to the gate of the transistor $M_2$, see FIG. *2c*. During the time interval ($t_1$–$t_2$) the voltage at the outputs $\Phi_1$ and $\Phi_2$ of the switching voltage source S is equal − . . . to −E volts, see FIGS. *2a* and *2b*. During this time interval, the transistor $M_3$ is conductive and the storage capacitor $C_1$ is charged until the voltage across it has become equal to −E volts, see FIG. *2d*. During the same time interval, the transistor $M_8$ of the second stage also is conductive. Consequently, a stray capacitance $C_{s2}$ between the drain and the substrate of the transistor $M_6$ will be charged until the voltage across it has become equal to −E volts. Since the charging of the storage capacitor $C_1$ and that of the stray capacitance $C_{s2}$ take place during the same time interval, the voltage across the stray capacitance $C_d$ between the drain and the gate of the transistor $M_6$ will be equal to 0 volts. During the time interval ($t_2$–$t_3$) the transistors $M_1$ and $M_2$ are conductive so that the storage capacitor $C_1$ is discharged until the voltage across it has become equal to 0 volts, see FIG. 4 *d*. Since during the interval under consideration the voltage at the drain of the transistor $M_6$ is equal to −E volts, see FIG. *4b*, at the end of the said interval the voltage across the capacitance $C_d$ will be equal to −E volts. Consequently, during the said time interval no charge division between the storage capacitor $C_1$ and the stray capacitance $C_d$ takes place. Hence, the voltage across the storage capacitor $C_1$ is independent of the ratio of the capacitance values of $C_1$ and $C_d$. Consequently, if a very fast delay element is desired, the storage capacitor $C_1$ may be given any desired small value (for example 0.01 pF). Further transfer of the information stored in the storage capacitor $C_1$ to the storage capacitor $C_2$ is analogous to the corresponding transfer of the information stored in the storage capacitor $C_1$ of the shift register shown in FIG. 1 to the storage capacitor $C_2$ of this shift register. For completeness, this is shown in FIGS. *4e* to *4g*. The source of the transistor $M_6$ is connected to the clock-pulse line 3 via the main current path of the transistor $M_{10}$. This is to prevent the transistor $M_6$ from be-coming conductive in the phases $\Phi_1$ and $\Phi_2$ of the clock-pulse signal. The source of the transistor $M_2$ is connected to the clock-pulse line 1 via the main current path of the transistor $M_9$. This is to prevent the transistor $M_2$ from becoming conductive in the phases $\Phi_3$ and $\Phi_4$ of the clock-pulse signal.

In the embodiment of the delay element according to the invention shown in FIG. 3, the drain of the transistor $M_2$ is connected to the clock-pulse line 3 via the main current path of the transistor $M_4$. Alternatively, however, the drain of the transistor $M_2$ may be connected to the clock-pulse line 4 via the transistor $M_4$. Similarly, the source of the transistor $M_2$ may be connected via the main current path of the transistor $M_9$ to the clock-pulse line 2 instead of to the clock-pulse line 1. The drain of the transistor $M_6$ may alternatively be connected via the main current path of the transistor $M_8$ to the clock-pulse line 1 instead of to the clock-pulse line 2. Similarly the source of the transistor $M_6$ may be connected via the main current path of the transistor $M_{10}$ to the clock-pulse line 4 instead of to the clock-pulse line 3.

What is claimed is:

1. A four-phase delay element comprising the cascade arrangement of at least a first and a second stage which each include at least a first and a second field-effect transistor, the source of the first transistor being connected to the drain of the second transistor, the drain of the first transistor of the first stage and the gate of the second transistor of the second stage being connected to a storage capacitor, means being provided for applying a logical signal to the gate of the second transistor of the first stage, the drain of the first transistor of the first stage being connected to a first clock-pulse line and the gate of this transistor being connected to a second clock-pulse line, the drain of the first transistor of the second stage being connected to a third clock-pulse line and the gate of this transistor being connected to a fourth clock-pulse line, characterized in that the drain of the second transistor of the first stage is also connected to the third or the fourth clock-pulse line and the drain of the second transistor of the second stage is connected to the first or the second clock-pulse line, means for connecting the source of the second transistor of the first stage to the first or second clock-pulse line and for isolating the source of the second transistor from the second clock-pulse line during the application of clock pulses to the first and second clock-pulse lines and means for connecting the source of the second transistor of the second stage to the third or fourth clock-pulse line and for isolating the second transistor of the second stage from the third clock-pulse line during the application of clock-pulses to the third and fourth clock-pulse lines.

2. A four-phase delay element as claimed in claim 1, characterized in that the drain of the second transistor of the first stage is connected via the main current path of at least one third field-effect transistor to the third or the fourth clock-pulse line, the drain of the second transistor of the second stage being connected via the main current path of at least one fourth field-effect transistor to the first or the second clock-pulse line.

3. A four-phase delay element as claimed in claim 1, characterized in that the source of the second transistor of the first stage is connected via the main current path of a field-effect transistor to the first or the second clock-pulse line, the source of the second transistor of the second stage being connected via the main current path of a transistor to the third or the fourth clock-pulse line.

* * * * *